US012794410B1

(12) United States Patent
Moyer et al.

(10) Patent No.: US 12,794,410 B1
(45) Date of Patent: Nov. 10, 2026

(54) METHOD AND APPARATUS FOR PROVIDING SURVEILLANCE AND MONITORING EQUIPMENT AT TEMPORARY LOCATIONS

(71) Applicant: O.M.J.C. Signal, Inc., Waterloo, IA (US)

(72) Inventors: Harold Moyer, Readlyn, IA (US); Brandon Zabel, Cedar Falls, IA (US)

(73) Assignee: O.M.J.C. Signal, Inc., Waterloo, IA (US)

(*) Notice: Subject to any disclaimer, the term of this patent is extended or adjusted under 35 U.S.C. 154(b) by 353 days.

(21) Appl. No.: 18/649,718

(22) Filed: Apr. 29, 2024

Related U.S. Application Data

(60) Provisional application No. 63/462,774, filed on Apr. 28, 2023.

(51) Int. Cl.

| | |
|---|---|
| ***H02S 40/34*** | (2014.01) |
| ***H02G 11/00*** | (2006.01) |
| ***H02S 10/40*** | (2014.01) |
| ***H02S 30/20*** | (2014.01) |

(52) U.S. Cl.
CPC ........... *H02S 40/34* (2014.12); *H02G 11/006* (2013.01); *H02S 10/40* (2014.12); *H02S 30/20* (2014.12)

(58) Field of Classification Search
CPC .......... H02S 40/34; H02S 10/40; H02S 30/20; H02G 11/006; F16G 13/16; B60R 16/0215
See application file for complete search history.

(56) References Cited

U.S. PATENT DOCUMENTS

| | | | | |
|---|---|---|---|---|
| 2,972,857 A * | 2/1961 | Bodman | H02G 9/00 | 59/8 |
| 4,470,229 A * | 9/1984 | Muse | B66C 13/12 | 52/118 |
| 4,570,437 A * | 2/1986 | Moritz | F16G 13/16 | 59/900 |
| 4,647,884 A * | 3/1987 | Lang | F16G 13/16 | 343/890 |
| 4,672,805 A * | 6/1987 | Moritz | H02G 11/006 | 59/900 |
| 4,988,838 A * | 1/1991 | Kirtland | H02G 11/006 | 248/51 |
| 5,163,281 A * | 11/1992 | Kanehira | F16L 13/16 | 59/900 |
| 6,374,589 B1 * | 4/2002 | Kunert | F16G 13/16 | 59/78.1 |
| 6,510,682 B2 * | 1/2003 | Komiya | H02G 11/006 | 59/78.1 |
| 6,688,096 B2 * | 2/2004 | Wada | F16G 13/16 | 59/900 |
| 6,978,595 B2 * | 12/2005 | Mendenhall | H02G 11/006 | 59/900 |

(Continued)

*Primary Examiner* — Timothy Wilhelm
(74) *Attorney, Agent, or Firm* — Simmons Perrine PLC

(57) ABSTRACT

A mobile surveillance and monitoring equipment system where a three stage mast is used to permit elevation of equipment and provisioning of power to said equipment by an electric cable, which is external to the mast, and during retraction of said mast where less cable is required to extend from top to near bottom of the mast, extra length of the electric cable is caused to remain adjacent to the mast without requiring direct contact with the electric cable or any associated protective cover.

10 Claims, 16 Drawing Sheets

(56) References Cited

U.S. PATENT DOCUMENTS

| | | | | |
|---|---|---|---|---|
| 7,082,720 | B2 * | 8/2006 | Kobayashi | E05F 15/646 49/360 |
| 7,193,508 | B2 * | 3/2007 | Hill | G08B 13/19632 340/517 |
| 7,249,452 | B2 * | 7/2007 | Komiya | F16G 13/16 59/900 |
| 7,290,384 | B2 * | 11/2007 | Weber | F16G 13/16 248/51 |
| 7,317,160 | B2 * | 1/2008 | Utaki | F16G 13/16 59/78.1 |
| 7,520,122 | B2 * | 4/2009 | Kitagawa | H02G 3/0475 59/900 |
| 7,593,217 | B2 * | 9/2009 | Shahrokhi | F16M 11/08 52/39 |
| 8,413,416 | B2 * | 4/2013 | Egami | H02G 3/32 59/900 |
| 9,494,215 | B2 * | 11/2016 | Hermey | F16G 13/16 |
| 9,695,910 | B2 * | 7/2017 | Komiya | F16G 13/18 |
| 9,791,118 | B2 * | 10/2017 | Carpoff | F21S 9/043 |
| 9,809,179 | B2 * | 11/2017 | Inoue | H02G 3/0406 |
| 9,833,911 | B2 * | 12/2017 | Yoon | B25J 18/025 |
| 10,008,840 | B2 * | 6/2018 | Love | H02G 3/0406 |
| 10,907,706 | B2 * | 2/2021 | Cai | F16H 19/0663 |
| 11,078,790 | B2 * | 8/2021 | Holdsworth | E21B 7/027 |
| 11,599,091 | B2 * | 3/2023 | Edsinger | B25J 9/1615 |
| 11,680,691 | B2 * | 6/2023 | Palmenberg | F21S 9/032 362/183 |
| 11,820,013 | B2 * | 11/2023 | Edsinger | B25J 13/08 |
| 11,838,071 | B2 * | 12/2023 | Habering | G01R 31/58 |
| 12,323,086 | B2 * | 6/2025 | Sharp | H02S 10/40 |
| 2007/0251132 | A1 * | 11/2007 | Luoma | G09F 9/3026 40/541 |
| 2010/0212659 | A1 * | 8/2010 | Carpoff | H02S 30/20 126/627 |
| 2020/0280280 | A1 * | 9/2020 | Schelhaas | H02S 40/38 |
| 2023/0033406 | A1 * | 2/2023 | Sayles | H02S 10/40 |
| 2025/0074234 | A1 * | 3/2025 | Richter | B60L 53/35 |
| 2025/0210956 | A1 * | 6/2025 | Isoda | B60R 16/027 |
| 2025/0219380 | A1 * | 7/2025 | Isoda | B60R 16/0215 |

* cited by examiner

| Description | REF Number |
| --- | --- |
| igus 1st Stage Chain Mount | 13 |
| igus 2nd Stage Chain Mount | 14 |
| igus 3rd Stage Chain Mount | 15 |

METHOD AND APPARATUS FOR PROVIDING SURVEILLANCE AND MONITORING EQUIPMENT AT TEMPORARY LOCATIONS

CROSS REFERENCE TO RELATED APPLICATIONS

The present application claims the benefit of the filing date of provisional patent application having Ser. No. 63/462,774 filed on Apr. 28, 2023 by Harold Moyer entitled PORT-A-MAST TOWABLE TRAILER, which application is incorporated herein in its entirety by this reference.

FIELD OF THE INVENTION

The present invention generally relates to systems and methods for mobile provisioning of electronic equipment such as surveillance and monitoring equipment or traffic signals. While the discussion and description of the present invention is often focused on such electronic equipment, it can also be used for many other purposes, such as but not limited to, portable, communications equipment, and any other electronic equipment.

BACKGROUND OF THE INVENTION

This invention relates to mobile surveillance and monitoring equipment. Mobile surveillance and monitoring equipment are crucial components of security and public safety systems. They provide flexibility and efficiency when permanent surveillance and monitoring equipment are damaged or temporarily insufficient such as at events, after storms etc. Modern surveillance and monitoring equipment are designed to be easily deployable and movable to adapt to changing surveillance needs. They are typically mounted on trailers or portable structures, allowing transportation and installation at different locations as needed.

While mobile surveillance and monitoring equipment offer numerous benefits, several challenges persist, including cost, maintenance, and ensuring rapid deployability by a wide variety of persons. Additionally, extreme cold weather and/or high winds can make the process of deploying and retracting mobile surveillance and monitoring equipment difficult, even if the location is otherwise near ideal. Additionally, some applications result in temporary mobile equipment getting used for extended periods of time, in such cases, frequent and prolonged uses can often result in damaged wires.

Consequently, there is a need for improvement in mobile surveillance and monitoring equipment which eliminates or greatly reduces the down time associated with cable management during the deployment and retraction of mobile surveillance and monitoring equipment, and in the downtime associated with repairing wires damaged by wind.

SUMMARY OF THE INVENTION

More specifically, an object of the invention is to provide efficient mobile surveillance and monitoring equipment.

It is a feature of the present invention to include an improved cable management and protection system.

It is another feature of the present invention to directionally limit the movement of extra slack created in electric cables, when the mast is retracted.

It is an advantage of the present invention to decrease the time and resources required to deploy and retract mobile surveillance and monitoring equipment, especially in inclement weather.

It is yet another advantage of the invention to provide an increased size of a permitted zone around the mast where movement of other equipment such as folding solar panels, can be deployed without risking interaction with the electric cables.

The present invention includes the above-described features and achieves the aforementioned objects and advantages.

Accordingly, the present invention comprises the steps of:

A mobile equipment system comprising:

- a chassis 1
- running gear 4; coupled to the chassis;
- a tongue 7; coupled to the chassis;
- a plurality of leveling jacks 2; coupled to the chassis;
- a multi-stage mast, coupled to the chassis;
- a plurality of solar panels, coupled to the chassis;
- a winch, coupled to the multi-stage mast or coupled to the chassis;
- the multi-stage mast, having a first stage mast 7, a second stage mast 8 and a third stage mast 9;
- a first protective chain 10 extending from an upper portion of the first stage mast 7 to an upper portion of the second stage mast 8;
- a second protective chain 11 extending from an upper portion of the second stage 8 to an upper portion of the third stage mast 9;
- an electric cable 21 first directed downwardly through a first downward portion of the first protective chain 10 and exiting upwardly therefrom and before entering the second protective chain 11 from above, traversing a first side of said third stage mast 9; so that electric cable 21 makes an "S" curve where a portion thereof occurs when the electric cable 21 is internal to a downwardly direct portion of said second protective chain 11;
- each of said first protective chain 10 and second protective chain 11 is longer than a linear distance between their respective mounting points when the multi-stage mast is fully deployed, so that a first catenary shape is formed by said first protective chain 10 and a second catenary shape by said second protective chain 11;
- said electric cable 21 therefore is caused to exhibit two variably shaped catenary shaped portions therein when said multi-stage mast is fully deployed and also when fully retracted; and
- said electric cable 21 is configured to be coupled with a piece of equipment, coupled to an upper portion of said third stage mast 9.

Additionally, the present invention comprises:

A method of retracting a multi-stage mast of the type having an electric cable 21 extending upward from a power source to an elevated location, comprising the steps of;

- providing a trailer with a solar panel, a location for mounting a multi-stage mast; and an electric cable 21 for provisioning electric power to an elevated location;
- providing a first stage mast 7, a second stage mast 8, and a third stage mast 9; said electric cable 21 continuously located exterior of and from said first stage mast 7 across said second stage mast 8 and to said third stage mast 9; where said electric cable 21 is interior of a first protective chain 10 and a second protective chain 11;

retracting said multi-stage mast by retracting portions of said second stage mast 8 and said third stage mast 9 into a central void in said first stage mast 7, causing said first protective chain 10 to continuously change from a first catenary shape to a different catenary shape by simply retracting said multi-stage mast; and terminating said retracting said multi-stage mast when a low point of said catenary shape of said first protective chain 10 has progressed past a first protective chain guide 50 attached to said first stage mast 7.

BRIEF DESCRIPTION OF THE DRAWINGS

In the following description of the drawings, like reference numerals are employed to indicate like parts, in the various views like letters are used to indicate like sides of the mast.

DETAILED DESCRIPTION OF THE DRAWINGS

Figure 1:
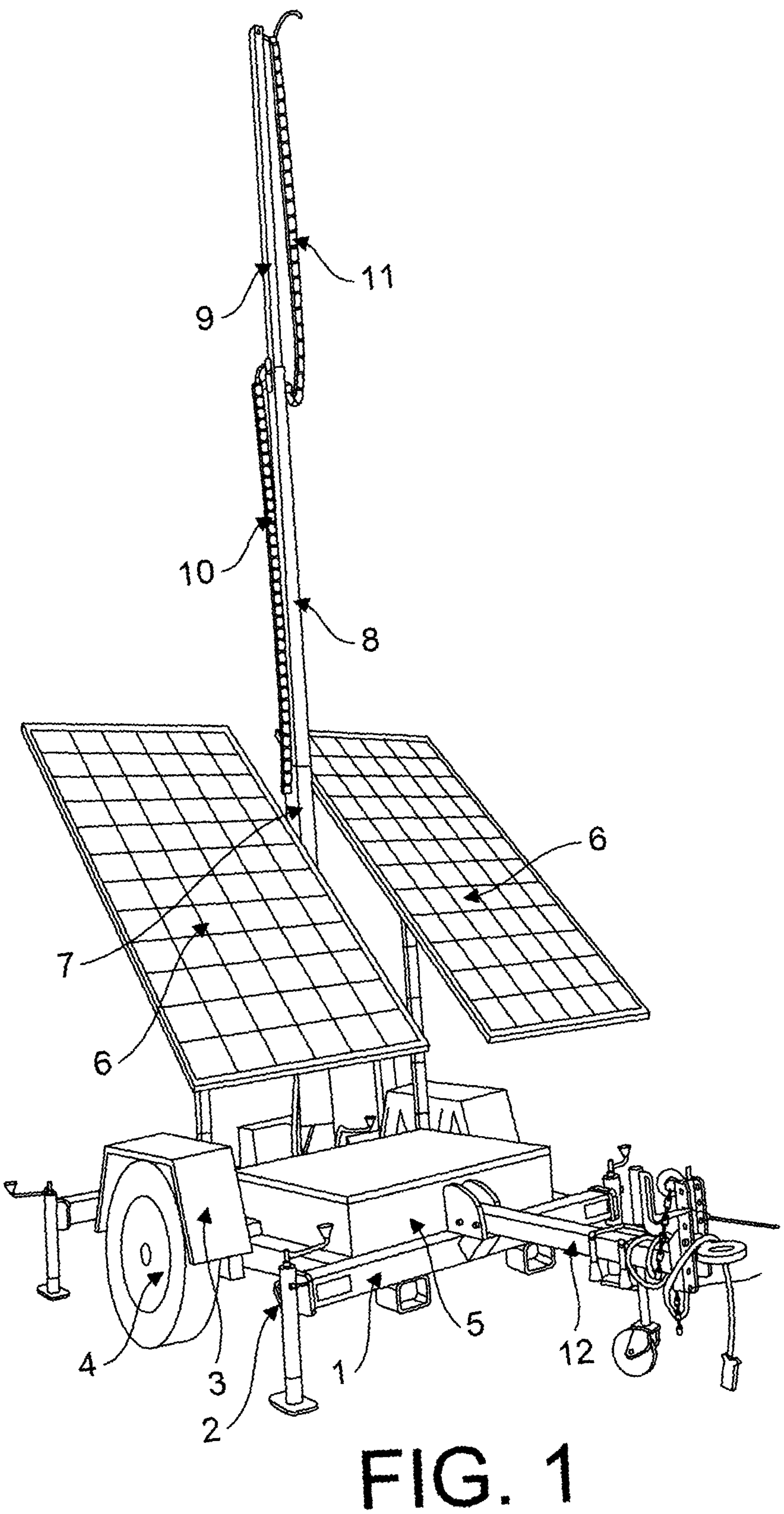
FIG. 1 is a perspective view of a system of the present invention with the mast in a fully deployed configuration.

Now referring to the drawings; where like numerals refer to like matter throughout, and more specifically to FIG. 1, there is shown a perspective view of the present invention with the mast in a deployed configuration and having a winch side W an A side to the left of W, a B side opposite of W and a C side right of W. The mast includes first stage mast 7, second stage mast 8, and third stage mast 9. Also shown are first protective chain 10 and second protective chain 11, which may be igus chain. The embodiment shown is a towable surveillance and monitoring equipment which contains the following: trailer frame or chassis 1, leveling jacks 2, fenders 3, running gear 4, battery compartment 5, and solar system 6, including two solar panels and associated wiring; which includes an electric cable 21, which could be an ethernet cable, power cable, a bundle of discrete wires, and other known means for transmitting power and control signals, or a coaxial cable providing video signals depending on whether the top of the mast is coupled to surveillance and monitoring equipment, a camera or other equipment. Also shown is lower protective chain 10, and upper protective chain 11; both of which are sized and configured to receive therethrough the electrical cable 21. These protective chains may be igus brand protective chains or any suitable substitute of protective chains designed for protecting, carrying, guiding electric cables.

Figure 2:
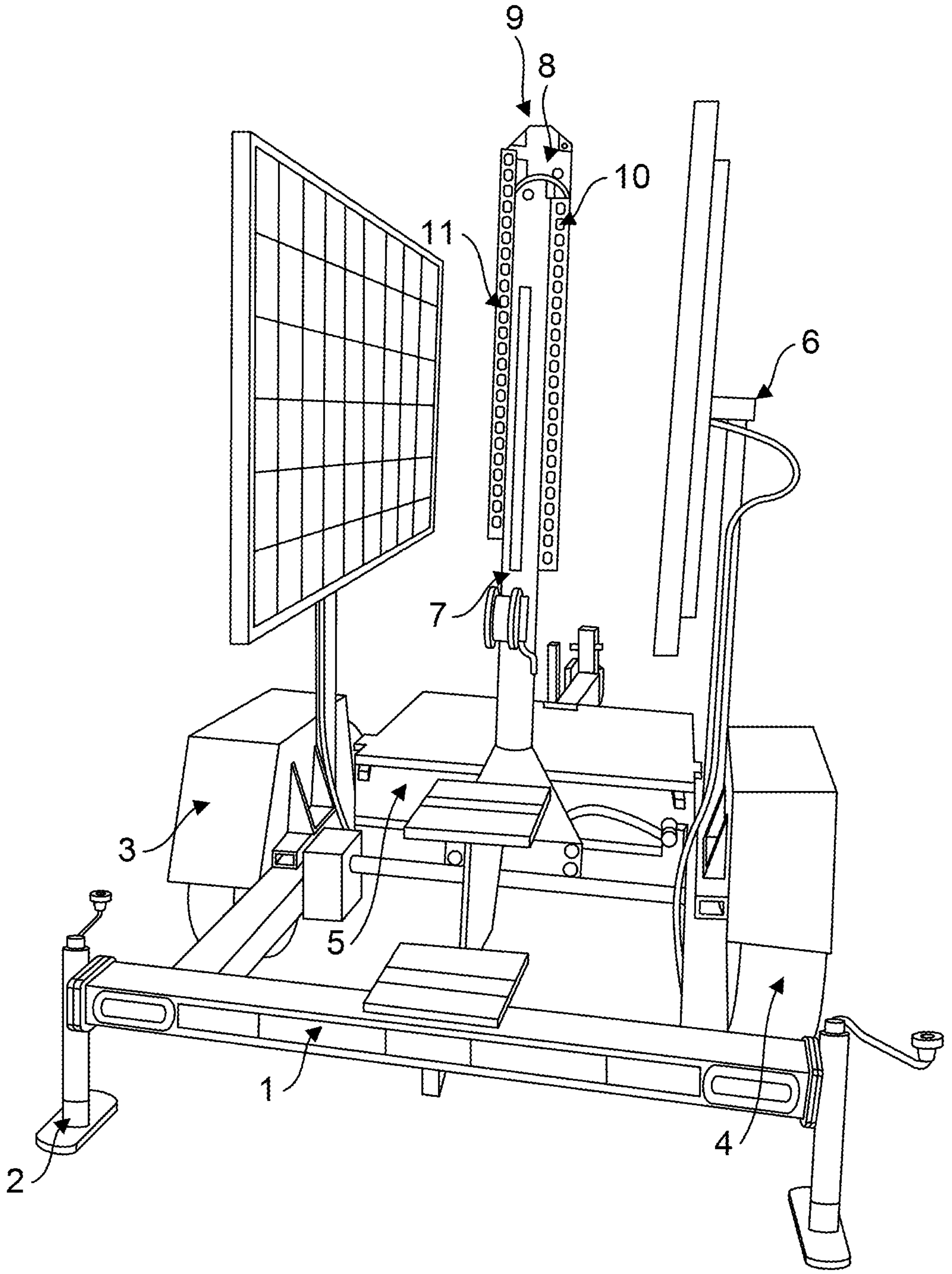
FIG. 2 is a perspective view of the system of FIG. 1, except that mast is fully retracted and the solar panels are in a travel configuration.

Now referring to FIG. 2, there is shown a perspective view of the present invention in a fully retracted configuration.

Figure 3:
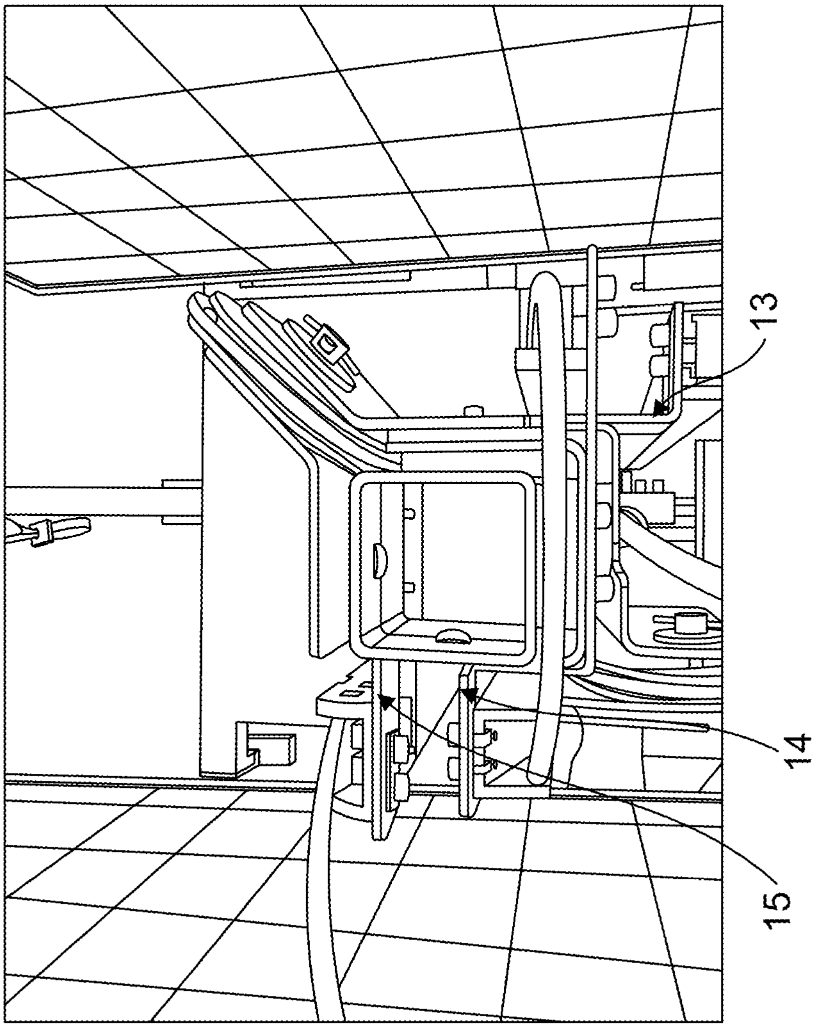
FIG. 3 is a top view of the mast of the system of FIG. 1 in a retracted configuration.

Now referring to FIG. 3, there is shown a top view of the mast portion of the present invention in a fully retracted state, with first stage chain mount 13, which mounts first protective chain 10, second stage chain mount 14 which mounts both first protective chain 10 and second protective chain 11, and third stage chain mount 15, which mounts only second protective chain 11.

Figure 4:
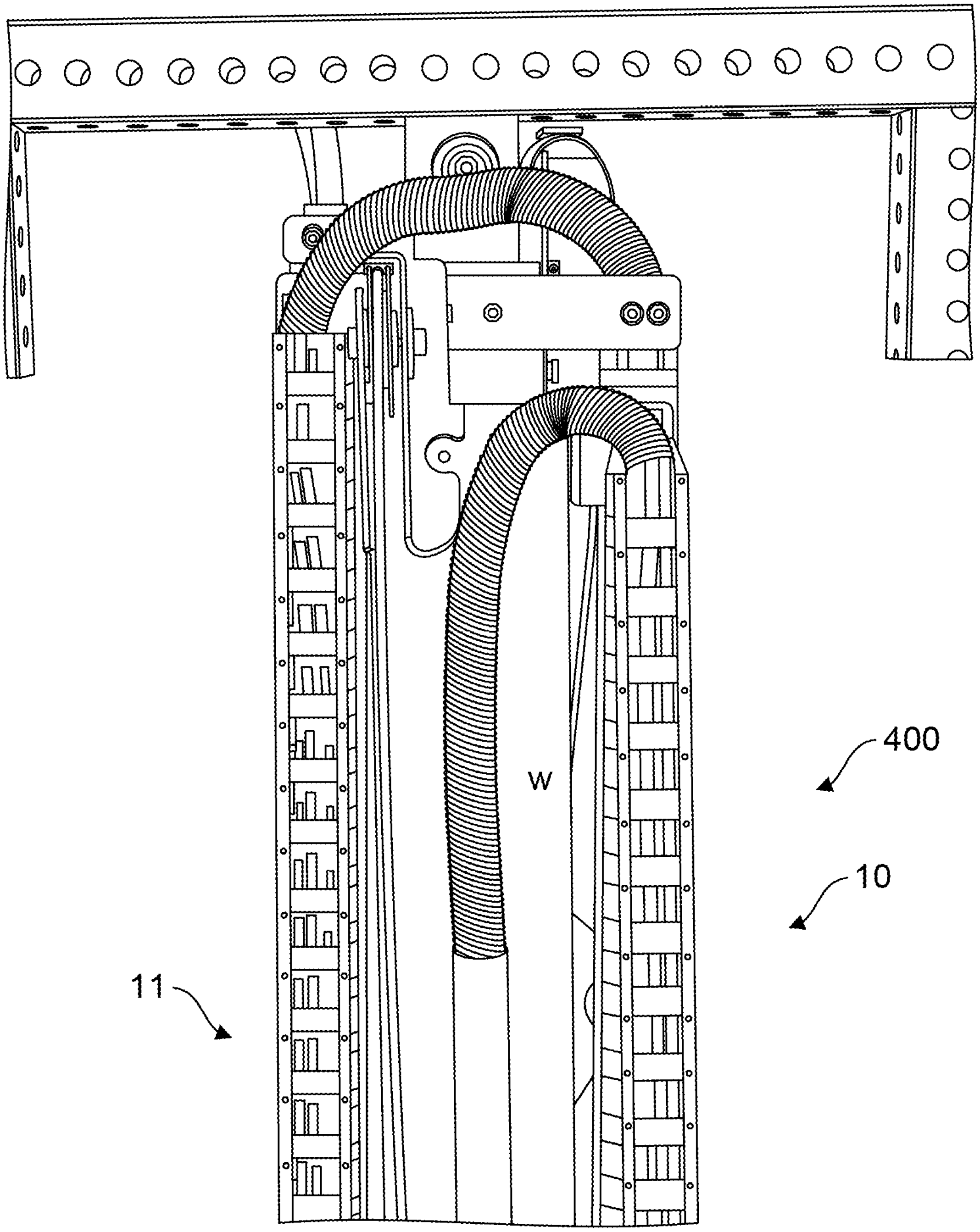
FIG. 4 is a perspective close up side view of a portion of the system of FIG. 3.

Now referring to FIG. 4, there is shown a winch side view (W) of an alternate embodiment of the mast of FIG. 2.

Figure 5:
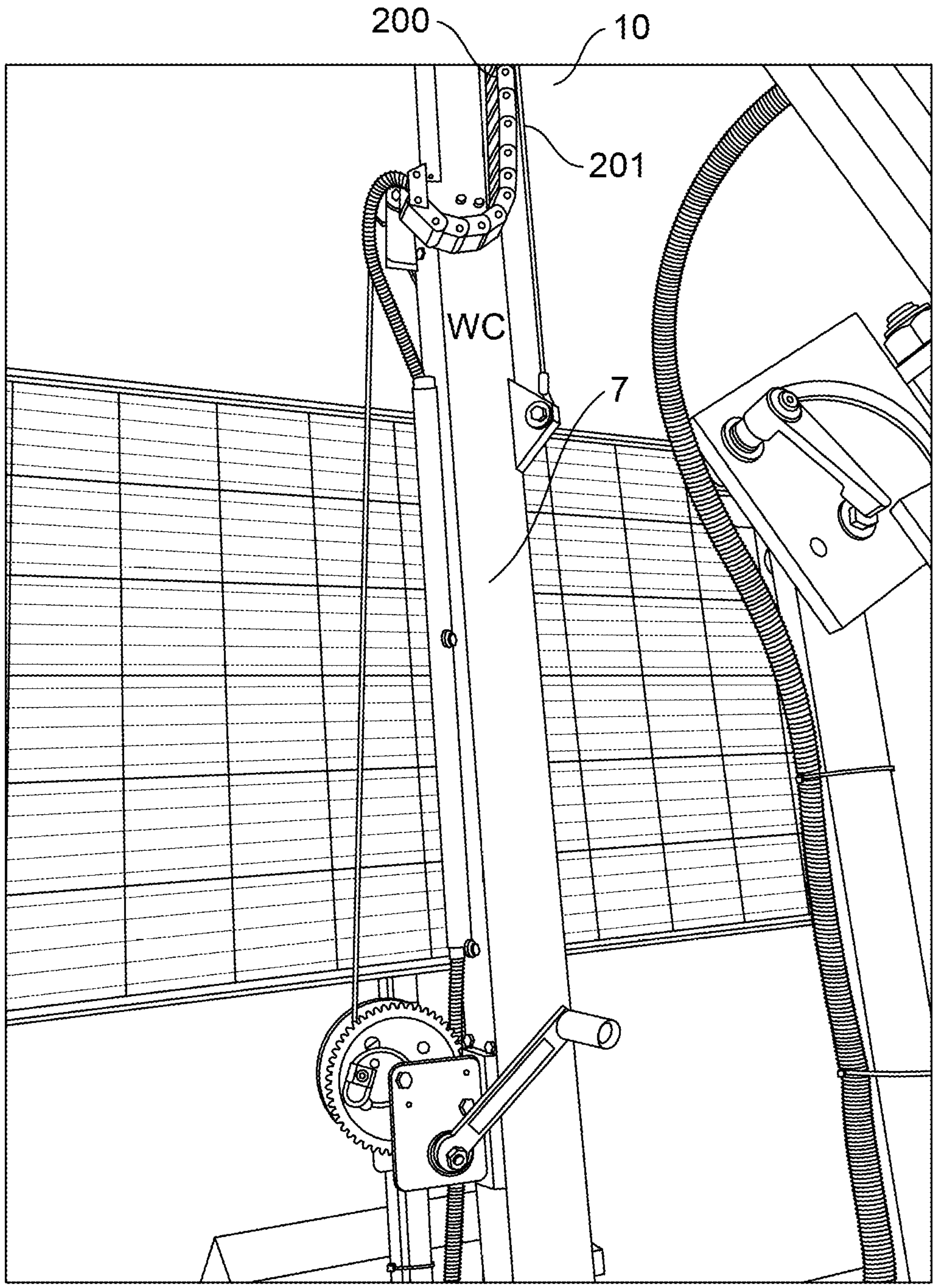
FIG. 5 is a perspective view of a lower portion of the mast of the present invention.

Now referring to FIG. 5, there is shown a perspective view of the present invention in a deployed configuration which shows first stage mast 7 and second stage mast 8 with first protective chain 10 coupled via a bracket to a winch mounting side of first stage mast 7, hereafter side, also shown is side C which is to the right when viewing side W straight on. First protective chain 10 may be an igus brand protective chain or other suitable chain for protecting an electric cable therein (not shown) which is disposed within flexible electric cable protecting conduit 81 and non-flexible electric cable protecting conduit 83. First protective chain 10 is shown in a catenary shape where the first protective chain 10 drops down to a lowest point and then turns upward and runs next to second stage mast 8.

Figure 6:
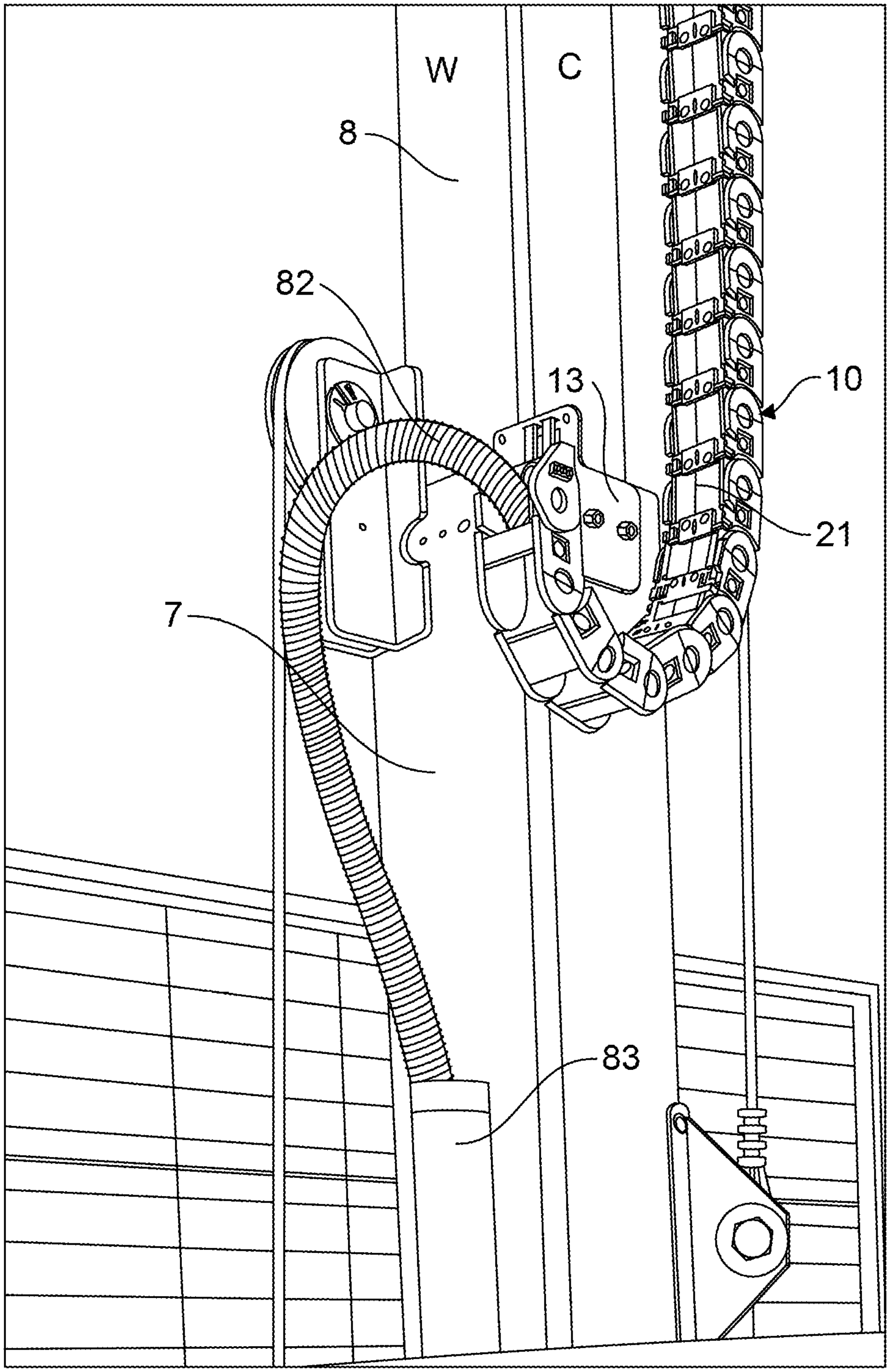
FIG. 6 is another perspective view of a lower portion of the mast of the present invention.

Now referring to FIG. 6, there is shown another perspective view of lower portions of the system in a deployed configuration with the electric cable 21.

Now being visible in the first protective chain 10 and showing as a light-colored line running internal to the first protective chain 10, is electric cable 21.

Figure 7:
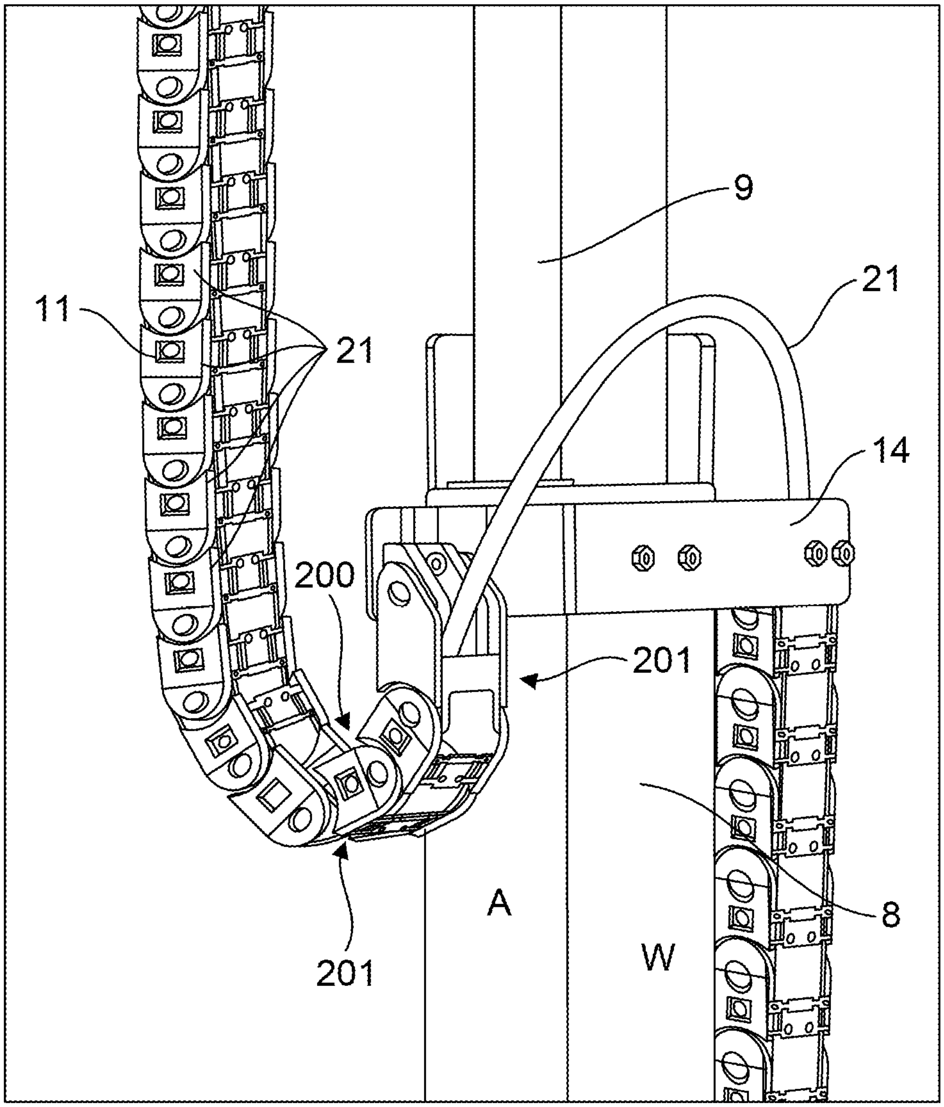
FIG. 7 is a perspective view of a middle portion of the mast of the present invention showing both chains, and a bracket holding them to the mast.

Now referring to FIG. 7, there is shown the middle portion of the mast which shows an exposed electric cable 21 extending between first protective chain 10 and second protective chain 11 at the boundary of second stage mast 8 and third stage mast 9. Note that both first protective chain 10 and second protective chain 11 are mounted to the second stage mast 8 with one second stage chain mount 14. Note that the first protective chain 10 and second protective chain 11 each have two sides with the same side being mounted to the second stage chain mount 14. This side of the chain shall be referred to as the mounting side 200 and is labeled in the inside curved portion of protective chain 11. The opposing side of the chains shall be referred to as the outside 201.

Figure 8:
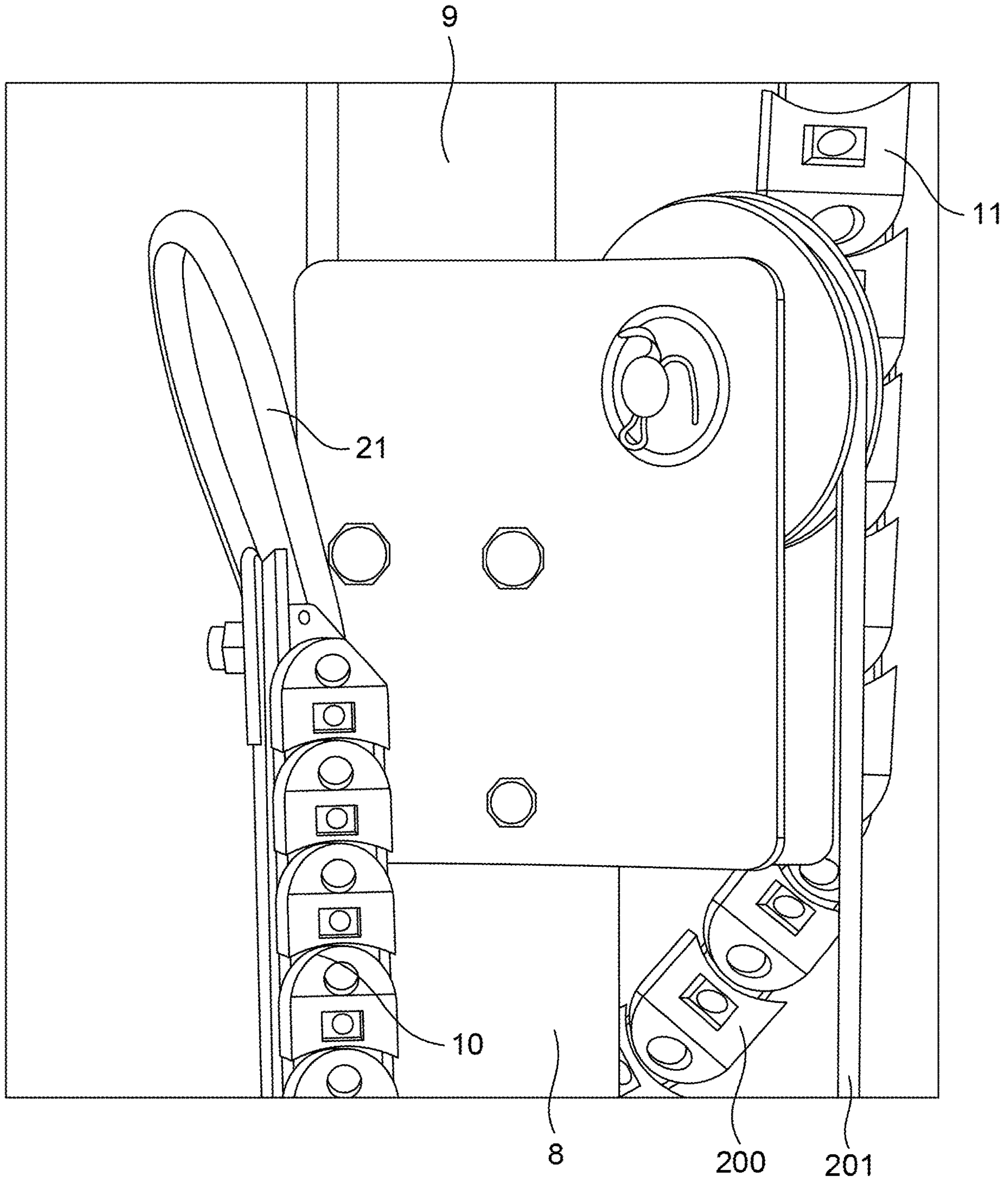
FIG. 8 is another perspective of a middle portion of the mast.

Now referring to FIG. 8, there is shown a middle section of the mast and both first protective chain 10 and second protective chain 11.

Figure 9:
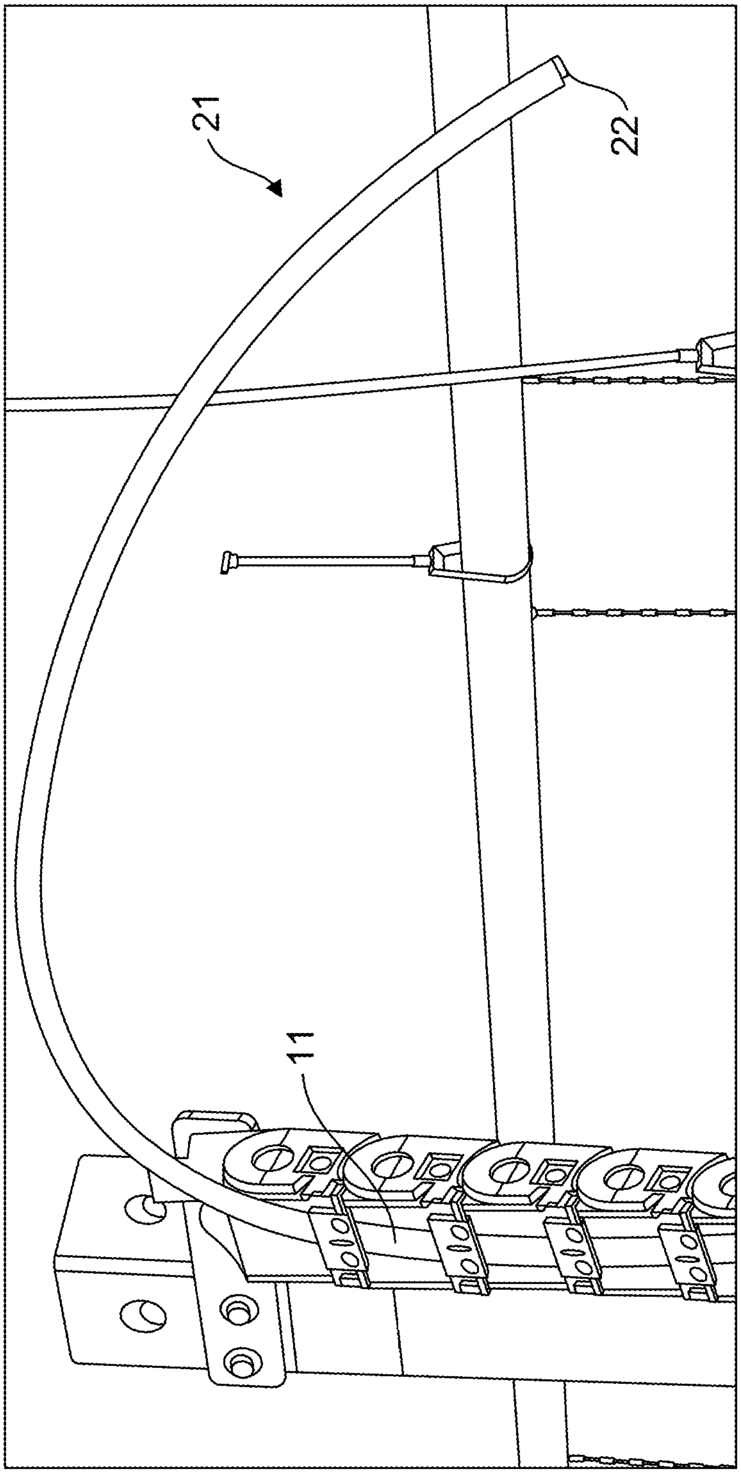
FIG. 9 is a perspective view of an upper portion of the present invention, without surveillance and/or monitoring equipment or any other equipment attached.
Figure 10:
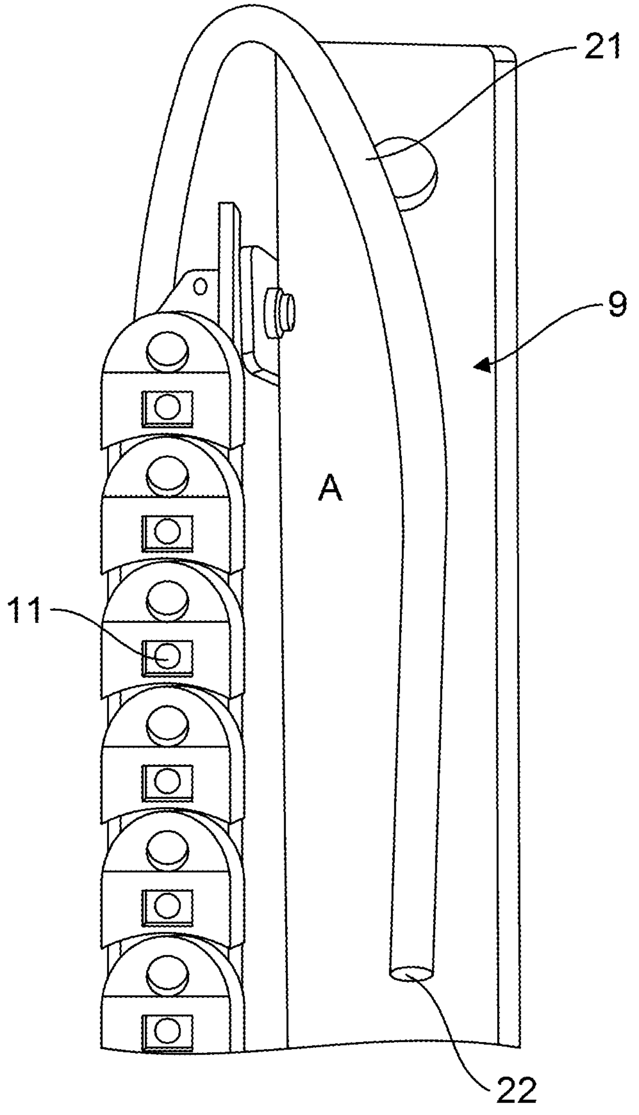
FIG. 10 is another perspective view of an upper portion of the mast.
Figure 11:
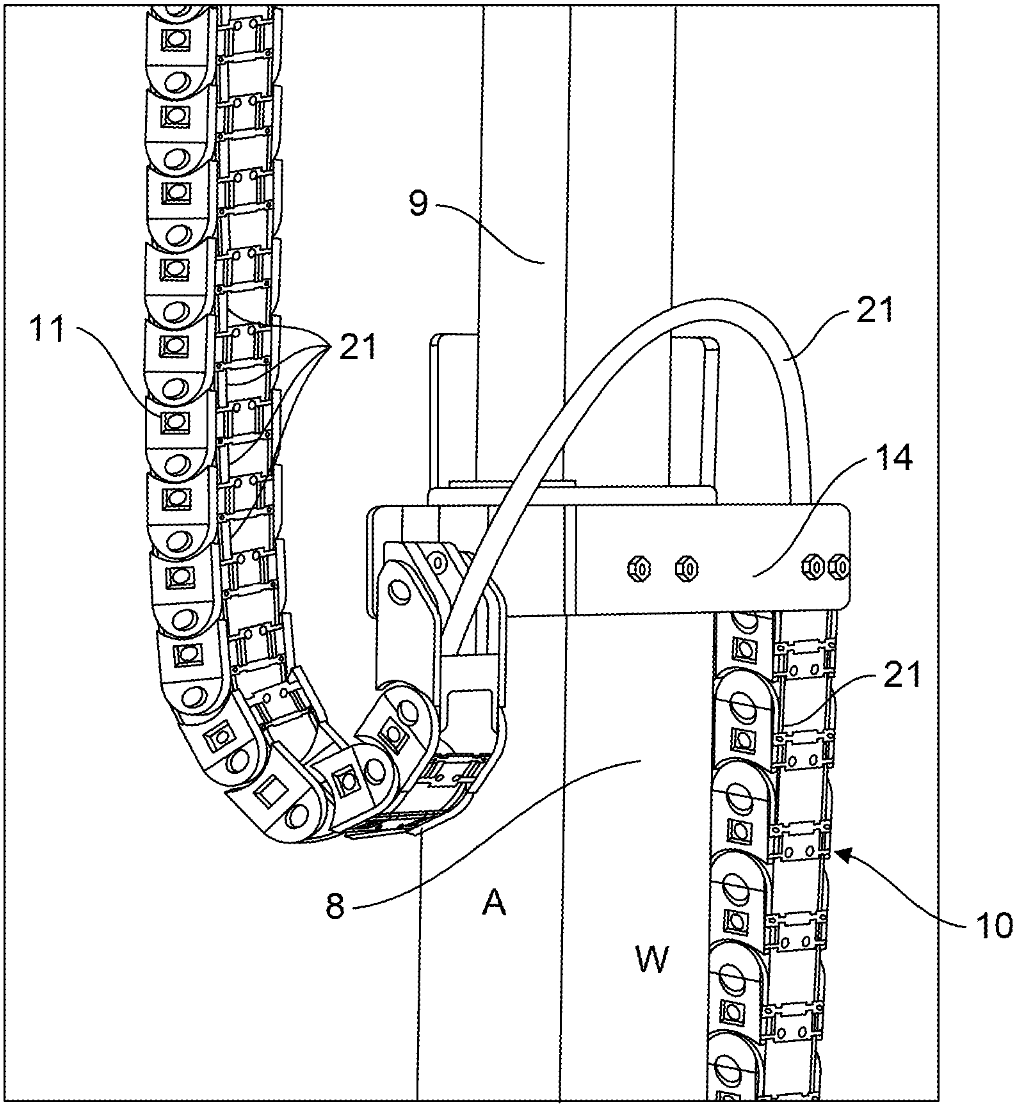
FIG. 11 is another perspective view a middle portion of the mast and is a closer view than provided by FIG. 7 and it shows the same side of each of the first protective chain 10 and second protective chain 11 are mounted to the same chain mounting bracket 120.
Figure 12:
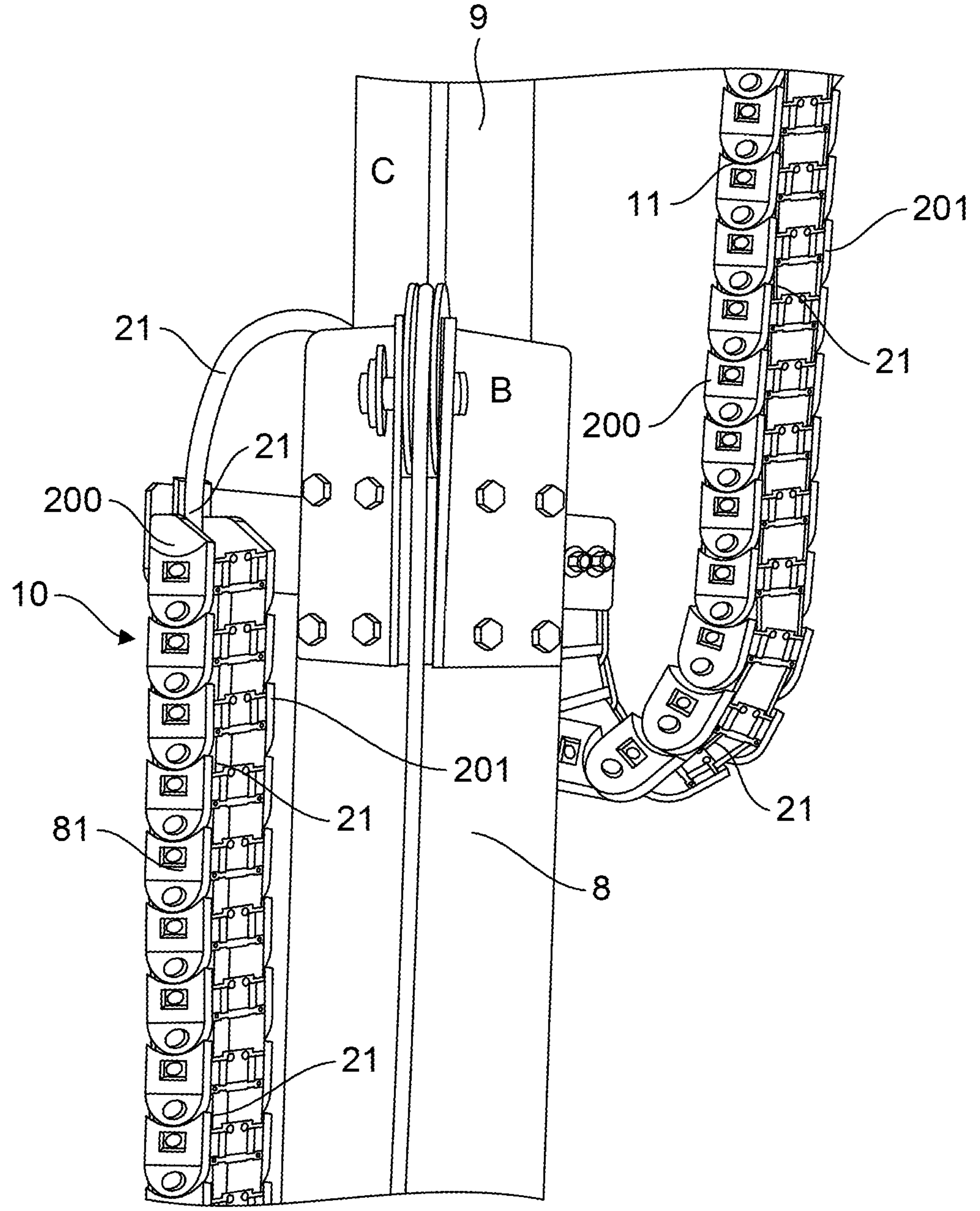
FIG. 12 is another perspective view of a middle portion of the mast.
Figure 13:
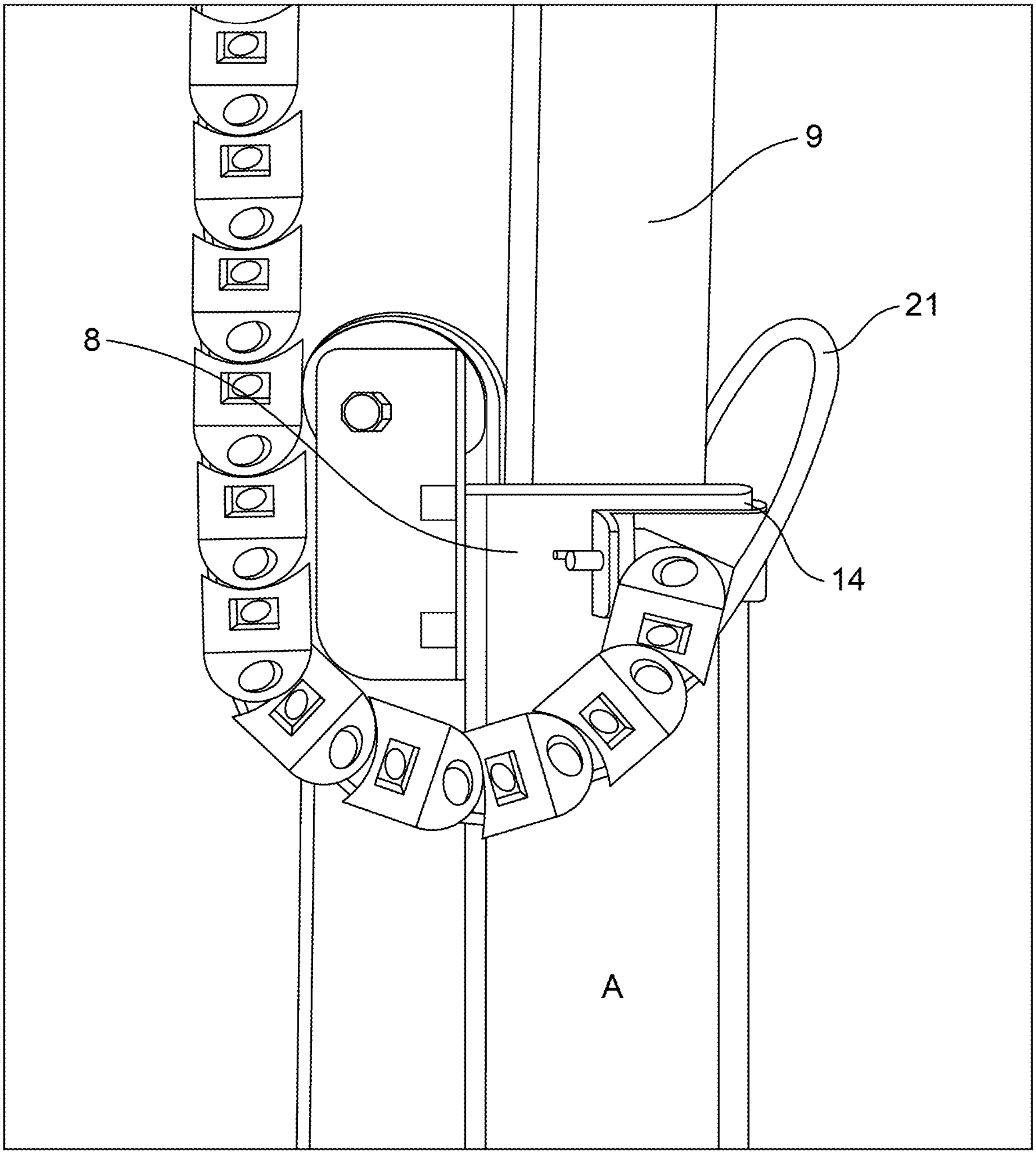
FIG. 13 is another perspective view of a middle portion of the mast.
Figure 14:
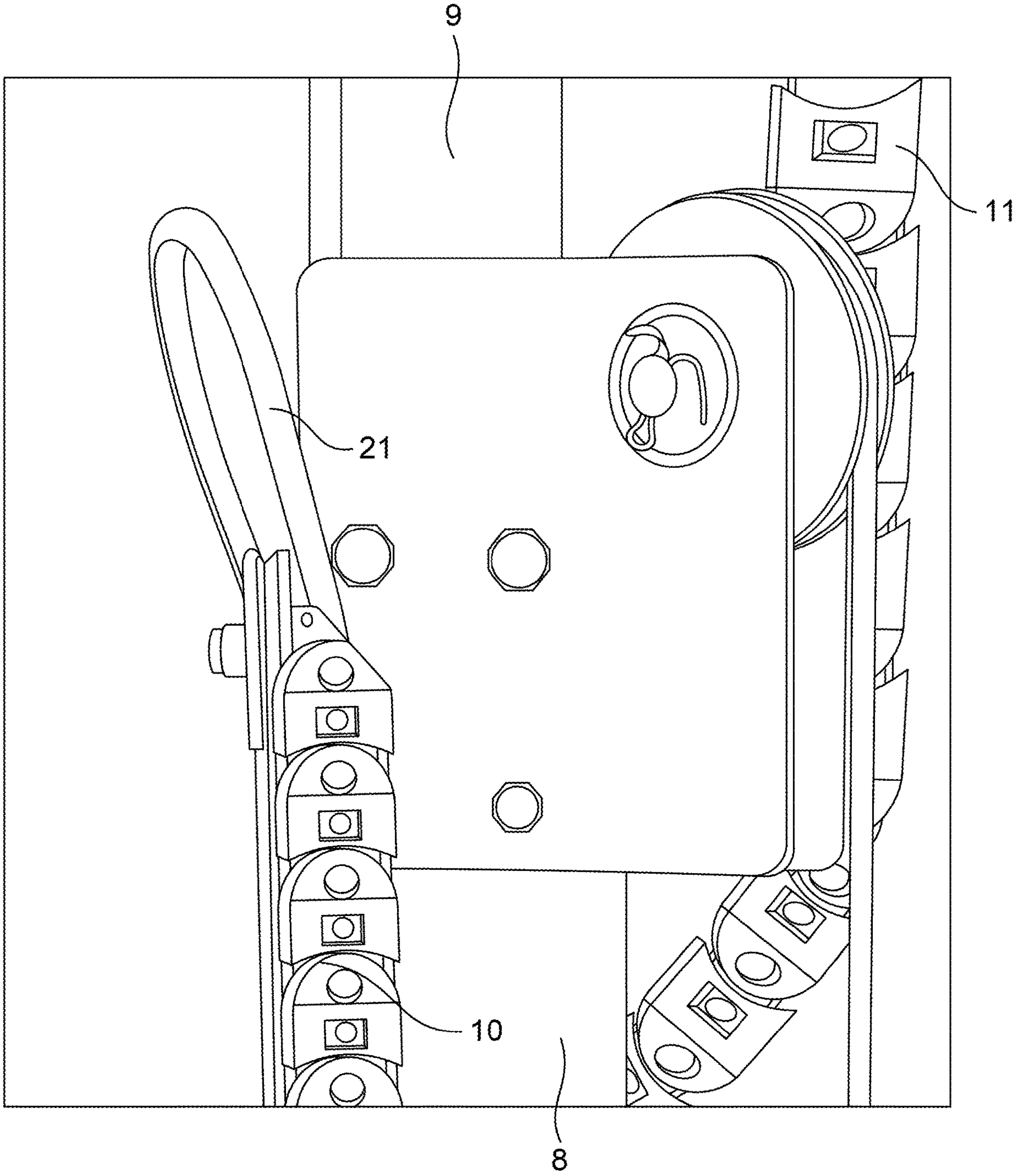
FIG. 14 is another perspective view of a middle portion of the mast.

Now referring to FIGS. 9 and 10, wherein each shows the electric cable 21 exiting out the top of second protective chain 11 where it could be coupled to a surveillance camera or other electronic equipment (not shown). FIG. 10 shows the end 22 of electric cable 21.

Now referring to FIGS. 11-14, wherein each is another perspective view of a middle portion of the mast and is a closer view than provided by FIG. 7 and they show that the same side of each of the first protective chain 10 and second protective chain 11 are mounted to the same second stage chain mount 14.

Figure 15:
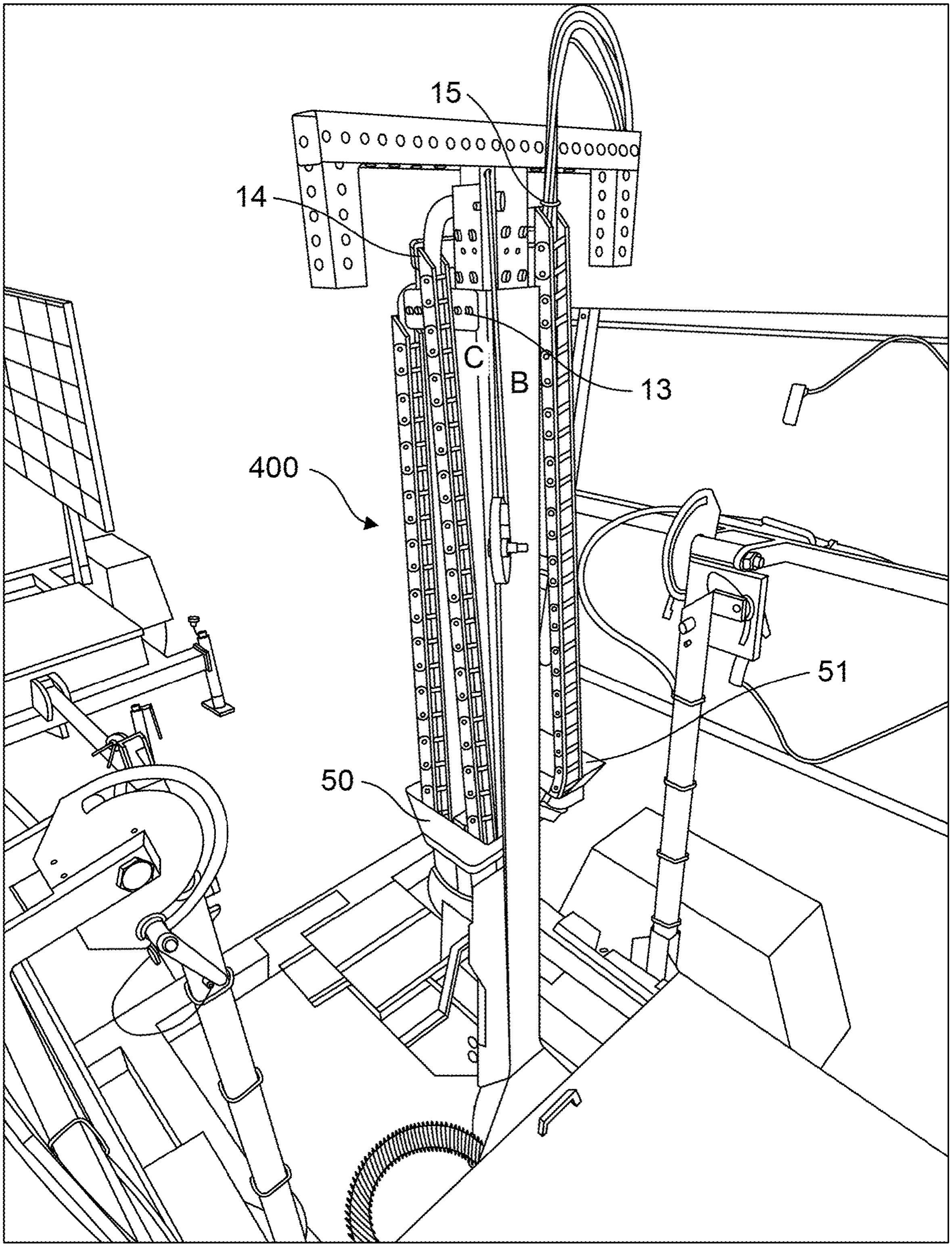
FIG. 15 is a perspective view of an alternate embodiment of the present invention.

FIG. 15 is a perspective view of an alternate embodiment of the present invention with an equipment mount and with a first protective chain guide 50 and second protective chain guide 51 for stabilizing first protective chain 10 and second protective chain 11, respectively, when in a transport configuration.

Figure 16:
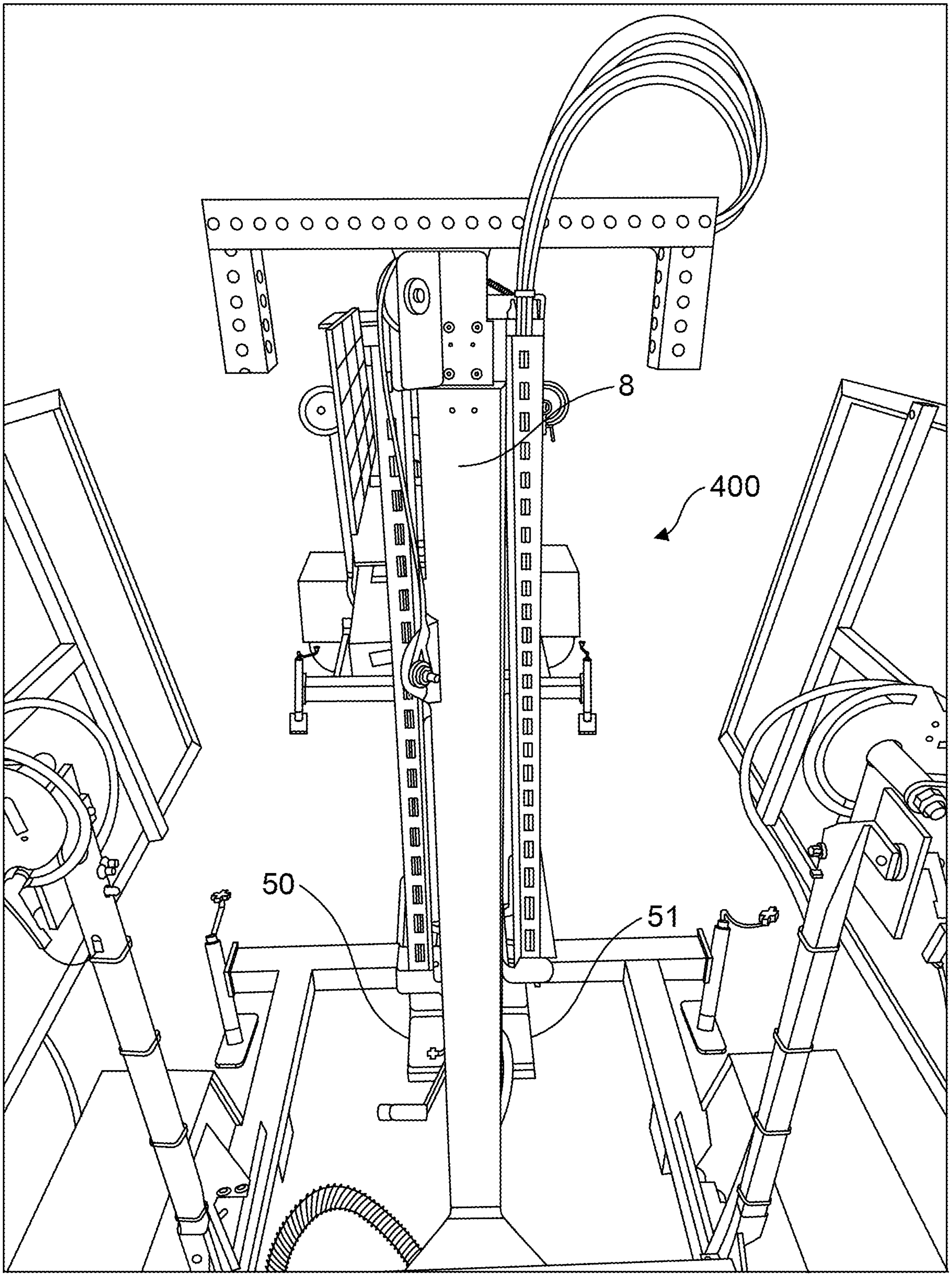
FIG. 16 is a side view of the retracted alternate embodiment of FIG. 15.

FIG. 16 is a side view of the embodiment of FIG. 15 showing both first protective chain 10 and second protective chain 11 neatly contained next to the first stage mast 7.

It is believed that when these teachings are combined with the known prior art by a person skilled in the art of mobile surveillance and monitoring equipment operations and, many of the beneficial aspects and the precise approaches to achieve those benefits will become apparent.

It will be understood that certain features and sub-combinations are of utility and may be employed without reference to other features and sub-combinations. This is contemplated by and is within the scope of the claims.

Since many possible embodiments may be made of the invention without departing from the scope thereof, it is understood that all matter herein set forth or shown in the accompanying drawings is to be interpreted as illustrative and not in a limiting sense.

We claim:

1. A mobile equipment system comprising:

a chassis 1;

a running gear 4, coupled to the chassis;

a tongue 7, coupled to the chassis;

a plurality of leveling jacks 2, coupled to the chassis;

a multi-stage mast, coupled to the chassis;

a plurality of solar panels, coupled to the chassis;

a winch, coupled to the multi-stage mast or coupled to the chassis;

the multi-stage mast having a first stage mast 7, a second stage mast 8 and a third stage mast 9;

a first protective chain 10 extending from an upper portion of the first stage mast 7 to an upper portion of the second stage mast 8;

a second protective chain 11 extending from an upper portion of the second stage 8 to an upper portion of the third stage mast 9;

an electric cable 21 first directed downwardly through a first downward portion of the first protective chain 10 and exiting upwardly therefrom and before entering the second protective chain 11 from above, traversing a first side of said third stage mast 9 so that electric cable 21 makes an "S" curve where a portion thereof occurs when the electric cable 21 is internal to a downwardly direct portion of said second protective chain 11;

wherein each of said first protective chain 10 and second protective chain 11 is longer than a linear distance between their respective mounting points when the multi-stage mast is fully deployed, so that a first catenary shape is formed by said first protective chain 10 and a second catenary shape by said second protective chain 11;

wherein said electric cable 21 therefore is caused to exhibit two variably shaped catenary shaped portions therein when said multi-stage mast is fully deployed and also when fully retracted; and wherein said electric cable 21 is configured to be coupled with a piece of equipment that is coupled to an upper portion of said third stage mast 9.

2. The mobile equipment system of claim 1 wherein when said multi-stage mast is being retracted said first catenary shape of said first protective chain 10 continuously changes shape to maintain a lower portion of said electric cable 21 in a single catenary shape hanging adjacent to said first stage mast 7.

3. The mobile equipment system of claim 2 wherein said first side of said third stage mast 9 is a W side.

4. The mobile equipment system of claim 2 wherein first protective chain 10 fits into first protective chain guide 50 when first stage mast 7, second stage mast 8, and third stage mast 9 are fully retracted.

5. The mobile equipment system of claim 4 wherein said electric cable 21 is shielded by a non-flexible conduit 83 and by a flexible conduit 81 before and after entering and exiting from first protective chain 10 and second protective chain 11.

6. The mobile equipment system of claim 5 wherein said electric cable 21 is shielded by a flexible conduit 81 where it is located between first protective chain 10 and second protective chain 11.

7. The mobile equipment system of claim 6 wherein said electric cable 21 provides power from a solar panel to a terminal portion 22 of said electric cable 21.

8. A method of retracting a multi-stage mast of the type having an electric cable 21 extending upward from a power source to an elevated location, comprising the steps of;

providing a trailer with a solar panel, a location for mounting a multi-stage mast; and an electric cable 21 for provisioning electric power to an elevated location;

providing a first stage mast 7, a second stage mast 8, and a third stage mast 9; said electric cable 21 continuously located exterior of and from said first stage mast 7 across said second stage mast 8 and to said third stage mast 9;

where said electric cable 21 is interior of a first protective chain 10 and a second protective chain 11;

retracting said multi-stage mast by retracting portions of said second stage mast 8 and said third stage mast 9 into a central void in said first stage mast 7, causing said first protective chain 10 to continuously change from a first catenary shape to a different catenary shape by simply retracting said multi-stage mast; and terminating said retracting said multi-stage mast when a low point of said catenary shape of said first protective chain 10 has progressed past a first protective chain guide 50 attached to said first stage mast 7.

9. The method of claim 8 where no direct manual contact and manipulation of the said first protective chain 10 is required to cause said low point to progress past said first protective chain guide 50.

10. The method of claim 8 where a second chain catenary shape of said second protective chain 11 is continuously changing from one catenary shape to another as said multi-stage mast is retracting; and a low point of said second catenary shape is caused to progress into said second protective chain guide 51.

* * * * *